(12) United States Patent
Saunders

(10) Patent No.: US 6,812,865 B2
(45) Date of Patent: Nov. 2, 2004

(54) DATA COMPRESSION

(75) Inventor: Nicholas Ian Saunders, Basingstoke (GB)

(73) Assignee: Sony United Kingdom Limited, Weybridge (GB)

(*) Notice: Subject to any disclaimer, the term of this patent is extended or adjusted under 35 U.S.C. 154(b) by 5 days.

(21) Appl. No.: 10/400,425

(22) Filed: Mar. 27, 2003

(65) Prior Publication Data

US 2003/0214422 A1 Nov. 20, 2003

(30) Foreign Application Priority Data

Mar. 28, 2002 (GB) ............................................ 0207419

(51) Int. Cl.$^7$ .............................................. H03M 7/34
(52) U.S. Cl. ..................... 341/51; 341/50; 382/239; 382/251; 375/240.02; 375/240.24
(58) Field of Search ...................... 341/50, 51; 382/239, 382/251; 348/14.13; 375/240.15, 240.03, 240.04, 240.24

(56) References Cited

U.S. PATENT DOCUMENTS

| | | | | |
|---|---|---|---|---|
| 5,475,502 A | * | 12/1995 | Lee et al. ................... | 382/239 |
| 5,627,581 A | * | 5/1997 | Kondo ..................... | 348/14.13 |
| 5,668,598 A | * | 9/1997 | Linzer et al. ........... | 375/240.15 |
| 6,028,633 A | * | 2/2000 | Saunders et al. ...... | 375/240.01 |
| 6,091,773 A | * | 7/2000 | Sydorenko ............. | 375/240.03 |
| 6,101,278 A | | 8/2000 | Chen et al. | |
| 6,282,242 B1 | * | 8/2001 | Isozaki et al. ......... | 375/240.04 |
| 6,351,226 B1 | * | 2/2002 | Saunders et al. ............ | 341/50 |
| 6,510,176 B1 | * | 1/2003 | Fukuda et al. ......... | 375/240.02 |
| 6,683,910 B1 | * | 1/2004 | Burns et al. ........... | 375/240.24 |

FOREIGN PATENT DOCUMENTS

| EP | 0 509 576 | 10/1992 |
|---|---|---|
| GB | 2 353 652 | 2/2001 |
| WO | WO 00/21302 | 4/2000 |

* cited by examiner

*Primary Examiner*—Jean Bruner Jeanglaude
(74) *Attorney, Agent, or Firm*—Frommer Lawrence & Haug LLP; William S. Frommer

(57) ABSTRACT

A data compression apparatus includes a source detection arrangement for detecting whether or not the input data is source data that has not undergone a previous compression/decompression cycle; a data quantity generator, responsive to the source detection arrangement, for setting a desired data output quantity for the compressed data, the desired data quantity having a first value for source input data and a second, higher, value for non-source input data; a target allocator for allocating a target data quantity to respective subsets of the input data in dependence upon the desired output data quantity, the target data quantities together providing a desired output data quantity; and a data compression arrangement for compressing each subset of the input data in accordance with its respective target data quantity.

12 Claims, 14 Drawing Sheets

| Q_SCALE_CODE | Q_SCALE | |
|---|---|---|
| | Q_SCALE_TYPE=0 (Linear Quantiser) | Q_SCALE_TYPE=1 (Non-Linear Quantiser) |
| 1 | 2 | 1 |
| 2 | 4 | 2 |
| 3 | 6 | 3 |
| 4 | 8 | 4 |
| 5 | 10 | 5 |
| 6 | 12 | 6 |
| 7 | 14 | 7 |
| 8 | 16 | 8 |
| 9 | 18 | 10 |
| 10 | 20 | 12 |
| 11 | 22 | 14 |
| 12 | 24 | 16 |
| 13 | 26 | 18 |
| 14 | 28 | 20 |
| 15 | 30 | 22 |
| 16 | 32 | 24 |
| 17 | 34 | 28 |
| 18 | 36 | 32 |
| 19 | 38 | 36 |
| 20 | 40 | 40 |
| 21 | 42 | 44 |
| 22 | 44 | 48 |
| 23 | 46 | 52 |
| 24 | 48 | 56 |
| 25 | 50 | 64 |
| 26 | 52 | 72 |
| 27 | 54 | 80 |
| 28 | 56 | 88 |
| 29 | 58 | 96 |
| 30 | 60 | 104 |
| 31 | 62 | 112 |

Fig. 4

DATA COMPRESSION

BACKGROUND OF THE INVENTION

1. Field of the Invention

The present invention relates to data compression.

2. Description of the Prior Art

Data compression techniques are used extensively in the data communications field in order to communicate data at bit rates that can be supported by communication channels having dynamically changing but limited bandwidths. Image data is typically compressed prior to either transmission or storage on an appropriate storage medium and it is decompressed prior to image reproduction.

In the case of still images data compression techniques take advantage of spatial redundancy, whilst for moving images both spatial and temporal redundancy is exploited. Temporal redundancy arises in moving images where successive images in a temporal sequence, particularly images belonging to the same scene, can be very similar. The Motion Picture Experts Group (MPEG) has defined international standards for video compression encoding for entertainment and broadcast applications. The present invention is relevant (though not at all restricted to) to implementations of the MPEG4 "Studio Profile" standard that is directed to high end video hardware operating at very high data rates (up to 1 Gbit/s) using low compression ratios.

Discrete Cosine Transform (DCT) Quantisation is a widely used encoding technique for video data. It is used in image compression to reduce the length of the data words required to represent input image data prior to transmission or storage of that data. In the DCT quantisation process the image is segmented into regularly sized blocks of pixel values and typically each block comprises 8 horizontal pixels by 8 vertical pixels ($8_H \times 8_V$). In conventional data formats video data typically has three components that correspond to either the red, green and blue (RGB) components of a colour image or to a luminance component Y along with two colour difference components Cb and Cr. A group of pixel blocks corresponding to all three RGB or YCbCr signal components is known as a macroblock (MB).

The DCT represents a transformation of an image from a spatial domain to a spatial frequency domain and effectively converts a block of pixel values into a block of transform coefficients of the same dimensions. The DCT coefficients represent spatial frequency components of the image block. Each coefficient can be thought of as a weight to be applied to an appropriate basis function and a weighted sum of basis functions provides a complete representation of the input image. Each $8_H \times 8_V$ block of DCT coefficients has a single "DC" coefficient representing zero spatial frequency and 63 "AC" coefficients. The DCT coefficients of largest magnitude are typically those corresponding to the low spatial frequencies. Performing a DCT on an image does not necessarily result in compression but simply transforms the image data from the spatial domain to the spatial frequency domain. In order to achieve compression each DCT coefficient is divided by a positive integer known as the quantisation divisor and the quotient is rounded up or down to the nearest integer. Larger quantisation divisors result in higher compression of data at the expense of harsher quantisation. Harsher quantisation results in greater degradation in the quality of the reproduced image. Quantisation artefacts arise in the reproduced images as a consequence of the rounding up or down of the DCT coefficients. During compressed image reproduction each DCT coefficient is reconstructed by multiplying the quantised coefficient (rounded to the nearest integer), rather than the original quotient, by the quantisation step which means that the original precision of the DCT coefficient is not restored. Thus quantisation is a "lossy" encoding technique.

Image data compression systems typically use a series of trial compressions to determine the most appropriate quantisation divisor to achieve a predetermined output bit rate. Trial quantisations are carried out at, say, twenty possible quantisation divisors spread across the full available range of possible quantisation divisors. The two trial adjacent trial quantisation divisors that give projected output bit rates just above and just below the target bit rate are identified and a refined search is carried out between these two values. Typically the quantisation divisor selected for performing the image compression will be the one that gives the least harsh quantisation yet allows the target bit rate to be achieved.

Although selecting the least harsh quantisation will result in the best possible image quality (i.e. the least noisy image) on reproduction for "source" image data that has not undergone one or more previous compression/decompression cycles, it has been established that this is not necessarily the case for "non-source" image data. An image that has been compressed and decompressed once is referred to as a $1^{st}$ generation image, an image that has been subject to two previous compression/decompression cycles is known as a $2^{nd}$ generation and so on for higher generations.

Typically the noise in the image will be systematically higher across the full range of quantisation divisors for the 2nd generation reproduced image in comparison to the noise at a corresponding quantisation divisor for the $1^{st}$ generation reproduced image. This can be understood in terms of the DCT coefficient rounding errors incurred at each stage of quantisation. However, it is known that when the 2nd generation quantisation divisor is chosen to substantially equal to that used in the $1^{st}$ generation compression, the noise levels in the $2^{nd}$ generation reproduced image will be substantially equal to the noise levels in the 1st generation reproduced image. Thus for non-source input image data the quantisation divisor having the smallest possible magnitude that meets a required data rate will not necessarily give the best reproduced image quality. Instead, a quantisation divisor substantially equal to that used in a previous compression/decompression cycle is likely to give the best possible reproduced image quality. Note however that the choice of quantisation divisor is constrained by the target bit rate associated with the particular communication channel which may vary from generation to generation.

To ensure that the "best" quantisation step is selected for so-called multi-generation images a backsearch process is used which starts with the quantisation value identified by the trial quantisations referred to above and performs further checks using harsher quantisation (quantisation divisors of larger magnitude). For each of these backsearch quantisation steps the data is quantised and subsequently dequantised. Alternatively, instead of dequantising, the error is calculated from the quantiser residual. The dequantised data is compared with a delayed (unquantised) version of the input image data and the backsearch quantisation step that results in the fewest errors on this comparison is selected for the final output stage of quantisation.

A problem arises with the backsearch process in the case where the Macro-Block target bit count for a $2^{nd}$ generation image is less than the Macro-Block target bit count for a corresponding $1^{st}$ generation image. As a consequence of the discrepancy between the target bit counts the $2^{nd}$ generation image data is quantised more harshly (using a larger quantisation divisor) than the $1^{st}$ generation image data. FIG. 1 schematically illustrates this problem. The backsearch process starts with the quantisation divisor Q_SCALE=Q_ ALLOC that was selected by a bit allocation/binary search process in accordance with the Macro-Block target bit count. The backsearch also involves testing a series of, say 12, harsher quantisations $Q_{B1}$ to $Q_{B12}$ than the quantisation corresponding to Q_ALLOC. The quantisation divisor (of those tested) that results in the least noise in the reproduced image Q_FINAL is determined. Thus the quantisation divisor $Q_1$ corresponding to the $1^{st}$ generation compression which is less harsh (smaller quantisation divisor) than Q_ALLOC is not found by the backsearch although $Q_1$ is the value that is likely to give the best image quality for the reproduced $2^{nd}$ generation image.

Although in principle this problem could be addressed by adjusting the starting point of the $2^{nd}$ generation backsearch so that it corresponds to a smaller quantisation divisor than Q_ALLOC thus the backsearch is more likely to encompass $Q_1$, this may result in selection of a smaller quantisation divisor. This would likely give rise to a larger bit rate than the communication system is capable of handling. An encoding bit rate that exceeded the predetermined maximum encoding bit rate could lead to unacceptable data loss.

SUMMARY OF THE INVENTION

This invention provides a data compression apparatus comprising:
- a source detection arrangement for detecting whether or not the input data is source data that has not undergone a previous compression/decompression cycle;
- a data quantity generator, responsive to the source detection arrangement, for setting a desired data output quantity for the compressed data, the desired data quantity having a first value for source input data and a second, higher, value for non-source input data;
- a target allocator for allocating a target data quantity to respective subsets of the input data in dependence upon the desired output data quantity, the target data quantities together providing a desired output data quantity; and
- a data compression arrangement for compressing each subset of the input data in accordance with its respective target data quantity.

The invention addresses the problems outlined above by setting the desired data quantity to a lower level for data which has not been previously compressed and decompressed. The difference can be made sufficiently small (e.g. 5%) so as not to be subjectively noticeable, but gives some headroom for the subsequent generation compression stages to achieve the same degree of quantisation as that used in the first generation. This can reduce the error rate in the subsequent generations.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 4 is a table of parameters used in the bit rate reduction process of the encoder of FIG. 1.

DESCRIPTION OF THE PREFERRED EMBODIMENTS

Figure 1:
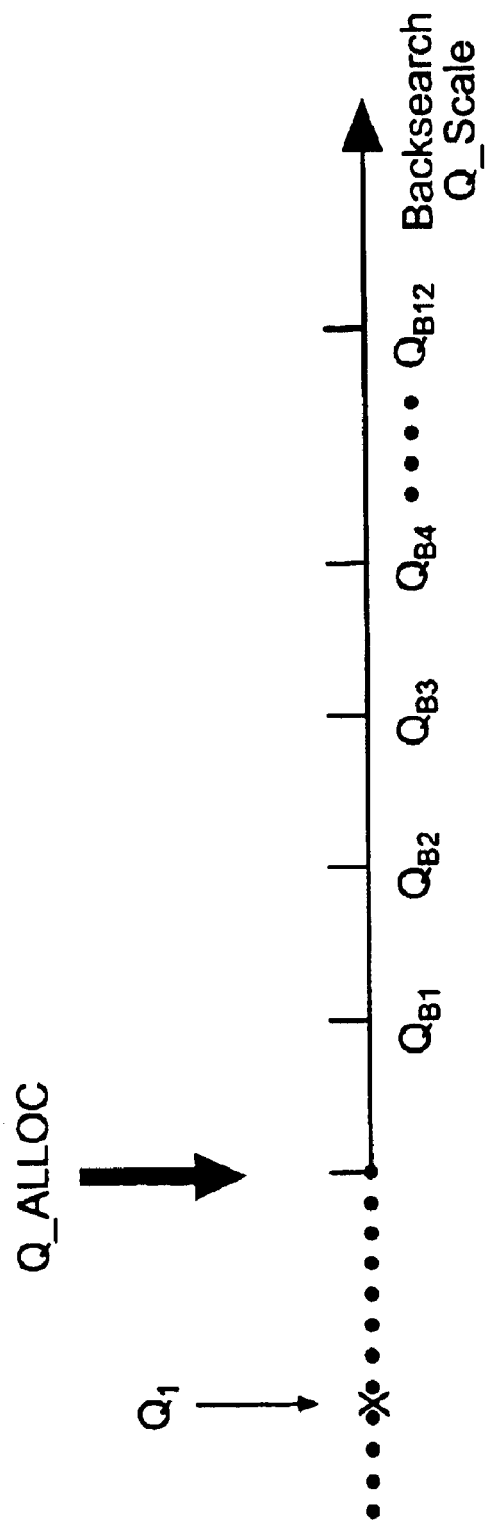
FIG. 1 schematically illustrates a problem with known backsearch techniques.
Figure 2:
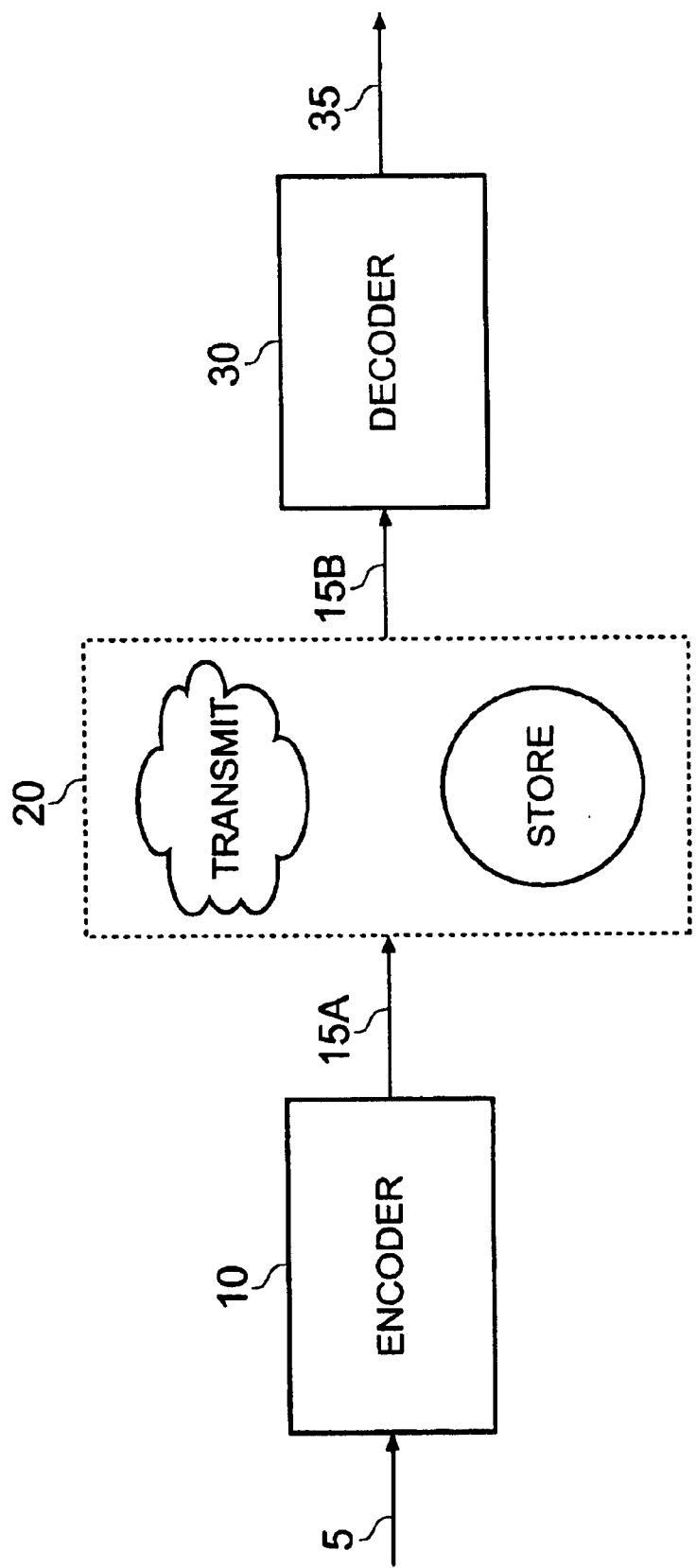
FIG. 2 is a schematic diagram of a compression encoder and a corresponding decoder for use with a data recording/reproducing device or a data transmission/reception system.

FIG. 2 is a schematic diagram of a data compression system. This system comprises an encoder 10, a data processing module 20 and a decoder 30. An input high definition video signal 5 is received by the encoder 10. The encoder 10 models the video image data to remove redundancy and to exploit its statistical properties and it produces output data symbols that represent the information in the input image data 5 in a compressed format. The encoder 10 outputs a compressed data signal 15A that is supplied to the data processing module 20 where it is either transmitted across a communication channel or stored on a recording medium. A compressed data signal 15B that was either read from the recording medium or received across a communication network is supplied to a decoder 30 that decodes the compressed data signal 15B to form a high definition output image signal 35.

Figure 3:
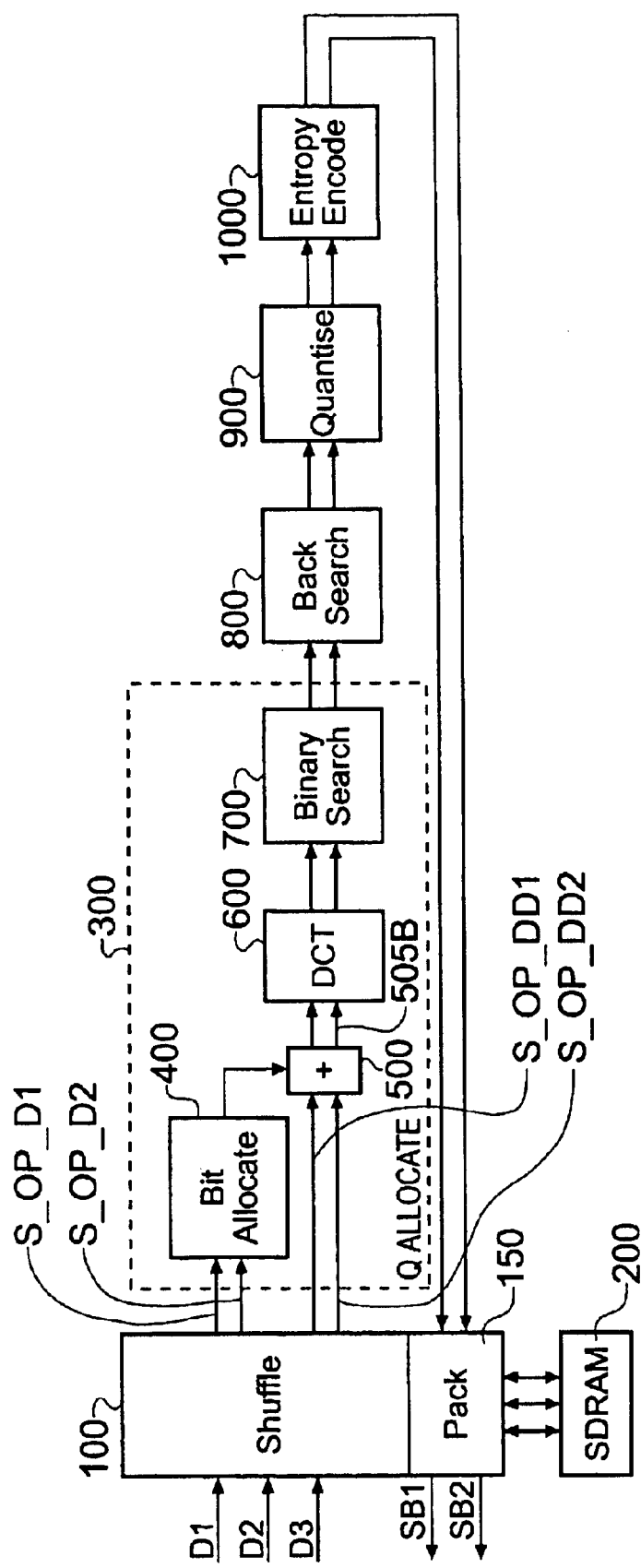
FIG. 3 schematically illustrates the bit rate reducing encoder of FIG. 1.

FIG. 3 schematically illustrates the bit rate reducing encoder of FIG. 2. Data signals D1, D2 and D3 correspond to RGB input channels for high definition video frames which are supplied as input to a shuffle unit 100. It will be appreciated that in an alternative embodiment the data could be supplied in $YC_BC_R$ format. Furthermore the images can be processed either in a progressive frame mode or in an interlaced field mode. The shuffle unit serves to distribute the input data into Macro-Block Units (MBUs). In this embodiment there are 40 MBUs per video frame, each of which comprises 204 MBs. Image samples of each input frame are temporarily written to an external SDRAM 200. During this shuffle write process the values for two quantisation divisor parameters Q_START and DCT_

PRECISION which are required for the subsequent encoding process are calculated. Blocks of pixels are read from the external SDRAM 200 according to a predetermined shuffle ordering that serves to interleave the image data so that blocks of pixels which are adjacent in the input image frame are not read out at adjacent positions in the shuffle ordering.

The shuffle process alleviates the effect of data losses on the image reconstructed by the decoder apparatus. Pixel blocks that are adjacent to each other in the input video frame are separated in the shuffled bit stream. A short duration data loss in which a contiguous portion of the bit stream is corrupted may affect a number of data blocks but these blocks will not be contiguous blocks in the reconstructed image. In this case data concealment can feasibly be used to reconstruct the missing blocks. Furthermore the shuffle process improves the picture quality during shuttle playback since it distributes input video data pseudo-randomly in the MBUs which serves to reduce the variation in the quantisation parameters selected for each MBU in an image frame.

A current image frame is written to the external SDRAM 200 while a previous frame is read, in shuffled format, from the external SDRAM 200. The shuffle unit 100 generates two output signal pairs: a first pair comprising signals S_OP_D1 and S_OP_D2 and a second pair comprising signals S_OP_DD1 and S_OP_$_{DD2}$ containing the same MBU data but delayed by approximately one MBU with respect to the first signal pair. The delay serves to compensate for the processing delay of a bit allocation module 400 belonging to a Q allocation unit 300. The first signal pair is used by the Q allocation unit 300 to determine an appropriate coding mode and a quantisation divisor known as a Q_SCALE parameter for each MB of the MBU.

The output signals from the shuffle unit 100 are supplied to the Q allocation unit 300 that comprises the bit allocation module 400, a target insertion module 500, a DCT module 600 and a binary search module 700. The first output signal pair S_OP_D1 and S_OP_D2 from the shuffle unit 100 are input to the bit allocation module 400. These input signals comprise raster scanned $8_H \times 8_V$ vertical blocks of 12-bit video samples.

The bit allocation module 400 performs a comparison between lossless differential pulse code modulation (DPCM) encoding and DCT quantisation encoding.

DPCM is a simple image compression technique that takes advantage of the fact that spatially neighbouring pixels in an image tend to be highly correlated. In DPCM the pixel values themselves are not transmitted. Rather, a prediction of the probable pixel value is made by the encoder based on previously transmitted pixel values. A single DPCM encoding stage involves a DPCM reformat, a DPCM transform and entropy encoding calculations.

By way of contrast, the DCT quantisation encoding involves a single DCT transform plus several stages of quantisation using a series of quantisation divisors, each quantisation stage being followed by Huffman entropy encoding calculations. In this embodiment 6 trial quantisation divisors are tested by the bit allocation module 400. Huffman coding is a known lossless compression technique in which more frequently occurring values are represented by short codes and less frequent values with longer codes. The DCT trial encoding stages optionally involve quantisation that is dependent on the "activity" of an image area. Activity is a measure calculated from the appropriately normalised pixel variance of an image block. Since harsher quantisation is known to be less perceptible to a viewer in image blocks having high activity the quantisation step for each block can be suitably adjusted according to its activity level. Taking account of activity allows for greater compression while maintaining the perceived quality of the reproduced image.

The DPCM and DCT quantisation trial encoding stages are used to calculate MB bit targets constrained by a predetermined frame target based on the required encoding bit rate. For each MB the mode (DCT or DPCM) that gives the fewest encoded bits is selected for use. The bit allocation module outputs a signal 405 to the target insertion module 500. The signal 405 comprises information about the encoding mode selected for each Macro-Block, a Q_SCALE quantisation divisor value $Q_{BASE}$ to be used by a binary search module 700 and a bit count target for each Macro-Block. The information in the signal 405 is added to the bit stream of the delayed image data to which it corresponds by the target insertion module 500. The target insertion module 500 outputs two signals 505A and 505B which are supplied as inputs to the DCT module 600.

The DCT module 600 again calculates DCT coefficients, this time based on the delayed version of the image data. The DCT module 600 outputs the data to the binary search module 700. The binary search module 700 performs a second stage of Q allocation for each of the MBs that is to be DCT quantisation encoded and uses a binary search technique to determine an appropriate quantisation divisor for each Macro-Block. The binary search module 700 determines the quantisation divisor to a higher resolution (within a given range of available quantisation divisors) than the resolution used by the bit allocation module 400. In fact $Q_{BASE}$ is used to define a starting point for a five stage binary search that results in the selection of a higher resolution quantisation step Q_ALLOC for each DCT mode Macro-Block. The DPCM mode Macro-Blocks are routed through the binary search module 700 via a bypass function so that the data is unaltered on output.

The output from the binary search module 700 that includes the value $Q_{ALLOC}$ for each DCT mode Macro-Block is supplied to a back search module 800. The back search module 800 checks that the $Q_{ALLOC}$ value chosen for each MB is the "best" quantisation scale for encoding. As explained in the introduction, for image data that has undergone at least on previous encode/decode cycle, the least harsh quantisation that is achievable for a given target bit count will not necessarily give the smallest possible quantisation error for the Macro-Block. Instead, the smallest quantisation error is likely to be achieved by using a quantisation divisor that is substantially equal to the quantisation divisor used in the previous encode/decode cycle. Accordingly, the back search module 800 estimates the quantisation error for a range of quantisation divisors, starting at $Q_{ALLOC}$ and working towards harsher quantisations. It determines the quantisation step $Q_{FINAL}$ that actually produces the smallest possible quantisation error. The trial quantisations are performed on DCT mode Macro-Blocks only and a bypass function is provided for DPCM mode macroblocks.

The output from the back search module 800 which includes DCT blocks generated by the DCT encoder 600 together with the selected quantisation step $Q_{FINAL}$ is supplied to a quantiser 900 where the final quantisation is performed. The quantisation procedure is as follows:

In DCT mode encoding the single DC coefficient of each $8_H \times 8_V$ block is quantised according to the equation:

$$Q(DC)=DC/(DC\_QUANT*DCT\_SCALER)$$

where DC is the unquantised coefficient and DC_QUANT is a quantisation factor that is set by the system and is used to quantise all of the MBs. DC_QUANT is determined from DC_PRECISION as shown in the table below

| DC_PRECISION | 00 | 01 | 10 | 11 |
|---|---|---|---|---|
| DC_QUANT | 8 | 4 | 2 | 1 |

DC_PRECISION is set to a fixed value, preferably 00, for each frame.

DCT_SCALER is a quantisation factor determined by the DCT_PRECISION index such that DCT_SCALER= $2^{DCT\_PRECISSION}$. In this embodiment a convention is used where DCT_PRECISION has the four possible values 0, 1, 2, 3 and 3 corresponds to the most harsh quantisation. Note that a different convention is used in the MPEG4 Studio Profile standard where DCT_PRECISION=0 corresponds to the most harsh quantisation while DCT_PRECISION=3 corresponds to the least harsh quantisation.

Similarly the 63 AC coefficients of the block are quantised according to the equation:

$$Q(AC)=(AC*16)/(Q\_MATRIX*AC\_QUANTISE*DCT\_SCALER)$$

where AC is the unquantised coefficient and Q_MATRIX is an array of 64 weights, one for each element of the DCT block. AC_QUANTISE is the product of Q_SCALE and NORM_ACT. Q_SCALE is a factor corresponding to either a linear quantiser scale or a non-linear quantiser scale, as specified by a Q_SCALE_TYPE. Each of the Q_SCALE_TYPES comprises 31 possible values denoted Q_SCALE_CODE(1) to Q_SCALE_CODE(31). The table of FIG. 4 shows the Q_SCALE values associated with each Q_SCALE_TYPE for all 31 Q_SCALE_CODEs. In the above equation NORM_ACT is a normalised activity factor that lies in the range 0.5 to 2.0 for "activity on" but is equal to unity for "activity off".

AC_QUANTISE=NORM_ACT * Q_SCALE and is rounded up to the nearest Q_SCALE (i.e. a Q_SCALE that corresponds to a Q_SCALE_CODE in the Table of FIG. 3) before it is included as part of the divisor.

The results of the quantisations Q(DC) and Q(AC) are rounded using the known technique of normal infinity rounding. This technique involves rounding positive numbers less than 0.5 down (towards zero) and positive numbers greater than or equal to 0.5 up (towards plus infinity), whereas negative numbers greater than −0.5 are rounded up (towards zero) and negative numbers less than or equal to −0.5 are rounded down (towards minus infinity).

The bit allocation module 400, the binary search module 700 and the back search module 800 each implement a quantisation process in accordance with that implemented by the quantise module 900. However, in the binary search module 700 and the back search module 800 the factor NORM_ACT is always set equal to 1. Only during the bit allocation process carried out by bit allocation module 400, does NORM_ACT take a value other than 1. Since the MB targets generated during bit allocation take account of activity it need not be taken into account at subsequent stages.

The quantised data are output from the quantise module 900 and subsequently supplied to an entropy encoder 1000 where lossless data compression is applied according to the standard principles of entropy encoding. In this embodiment Huffman encoding is used, according to which, more frequently occurring values are represented using short codes while the less frequently occurring values are represented using longer codes.

The output from the entropy encoder 1000 is supplied to a packing module 150 within the shuffle unit 100. The packing module 150 together with the external SDRAM 200 is used to pack the variable length encoded data generated by the entropy encode module 1000 into fixed length sync-blocks. A sync-block is the smallest data block that is separately recoverable during reproduction of the image.

The packing function is implemented by manipulation of the SDRAM read and write addresses. Each MBU is allocated a fixed packing space in the SDRAM which is then subdivided into a nominal packing space for each MB. The total length of each MB must also be stored and this can either be calculated from the individual word lengths or passed directly from the entropy encode module 1000 to the packing module 150. The output from the encoder 10 comprises sync-block 1 data output SB1 and sync-block 2 data output SB2. An indication of the quantisation divisors used in the encoding process is also transmitted to the decoder 30.

Figure 5:
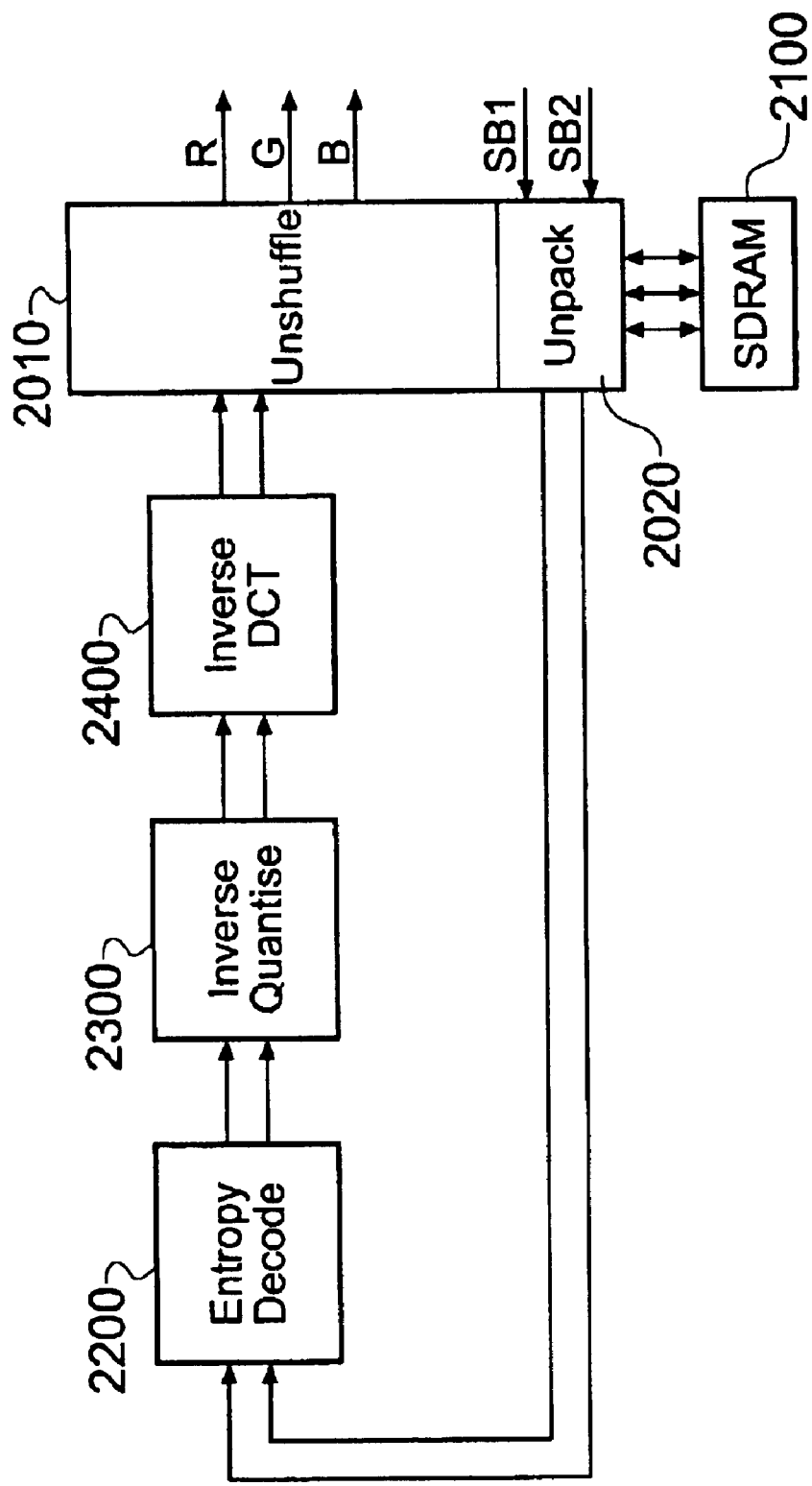
FIG. 5 schematically illustrates the decoder of FIG. 1.

FIG. 5 schematically illustrates the decoder 30 of FIG. 2. The decoder is operable to reverse the encoding process and comprises an unshuffle unit 2010, an unpack unit 2020, an external SDRAM 2100, an entropy decoding module 2200, an inverse quantiser 2300 and an inverse DCT module 2400. The sync-block data signals SB1 and SB2 that are either read from the recording medium or received across a data transfer network are received by the unpack unit 2020 that implements an unpacking function by writing to and reading from the external SDRAM 2100. The unpacked data is supplied to the entropy decoder that reverses the Huffman coding to recover the quantised coefficients which are supplied to the inverse quantiser 2300. The inverse quantiser 2300 uses information supplied by the encoder 10 about the quantisation divisors and multiplies the quantised coefficients by the appropriate quantisation divisors to obtain an approximation to the original DCT coefficients. This inverse quantisation process does not restore the original precision of the coefficients so quantisation is a "lossy" compression technique. The output from the inverse quantiser 2300 is supplied to the inverse DCT module 2400 that processes each block of frequency domain DCT coefficients using an inverse discrete cosine transform to recover a representation of the image blocks in the spatial domain. The output of the inverse DCT module 2400 will not be identical to the pre-encoded pixel block due to the information lost as a result of the quantisation process. Finally the output of the inverse DCT module 2400 is supplied to the unshuffle unit 2010 where the data is unshuffled to recover the image block ordering of the pre-encoded image. The output of the unshuffle unit 2010 comprises the three colour component video signals RGB from which the image can be reconstructed.

Figure 6:
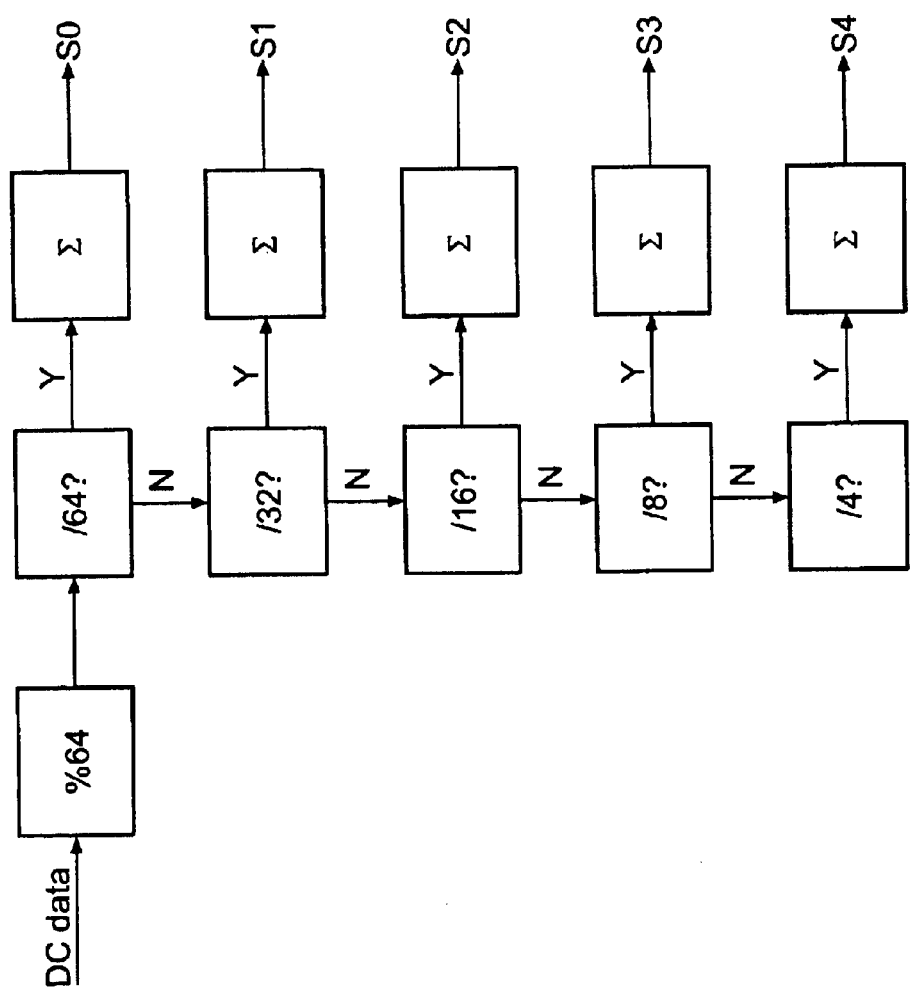
FIG. 6 schematically illustrates a calculation performed by a DCT_PRECISION detection circuit of the shuffle unit of FIG. 2.

FIG. 6 schematically illustrates a calculation performed by a DCT_PRECISION detection module(not shown) that is implemented in the shuffle unit 100. The DCT_PRECISION detection module determines whether the input video data is source or non-source and, in the case of non-source data, it detects the DCT_PRECISION index that was used in a previous encode/decode cycle. The value of DCT_PRECISION affects the quantisation of both DC and AC coefficients. Given that the value of DC_QUANT is known (DC_PRECISION set to fixed value 00 for each frame so that DC_QUANT=8 for this embodiment) it is possible to detect the value of DCT_PRECISION used in a previous generation by analysing the DC rounding effects. The DCT_PRECISION detection module is supplied with input video data and performs an analysis of the DC quantisation of this data. For each DCT block of the image field or frame the six Least Significant Bit (LSB) values for each of the 64 pixels of the block are summed to generate a 6-bit value $DC_{[5:0]}$ for each block. A frequency of occurrence of particular $DC_{[5:0]}$ values is built up according to the following algorithm:

$S_0$=number of occurrences of $DC_{[5:0]}$=00 0000

$S_1$=number of occurrences of $DC_{[5:0]}$=10 0000

$S_2$=number of occurrences of $DC_{[5:0]}$=x1 0000

$S_3$=number of occurrences of $DC_{[5:0]}$=xx1000

Figure 7:
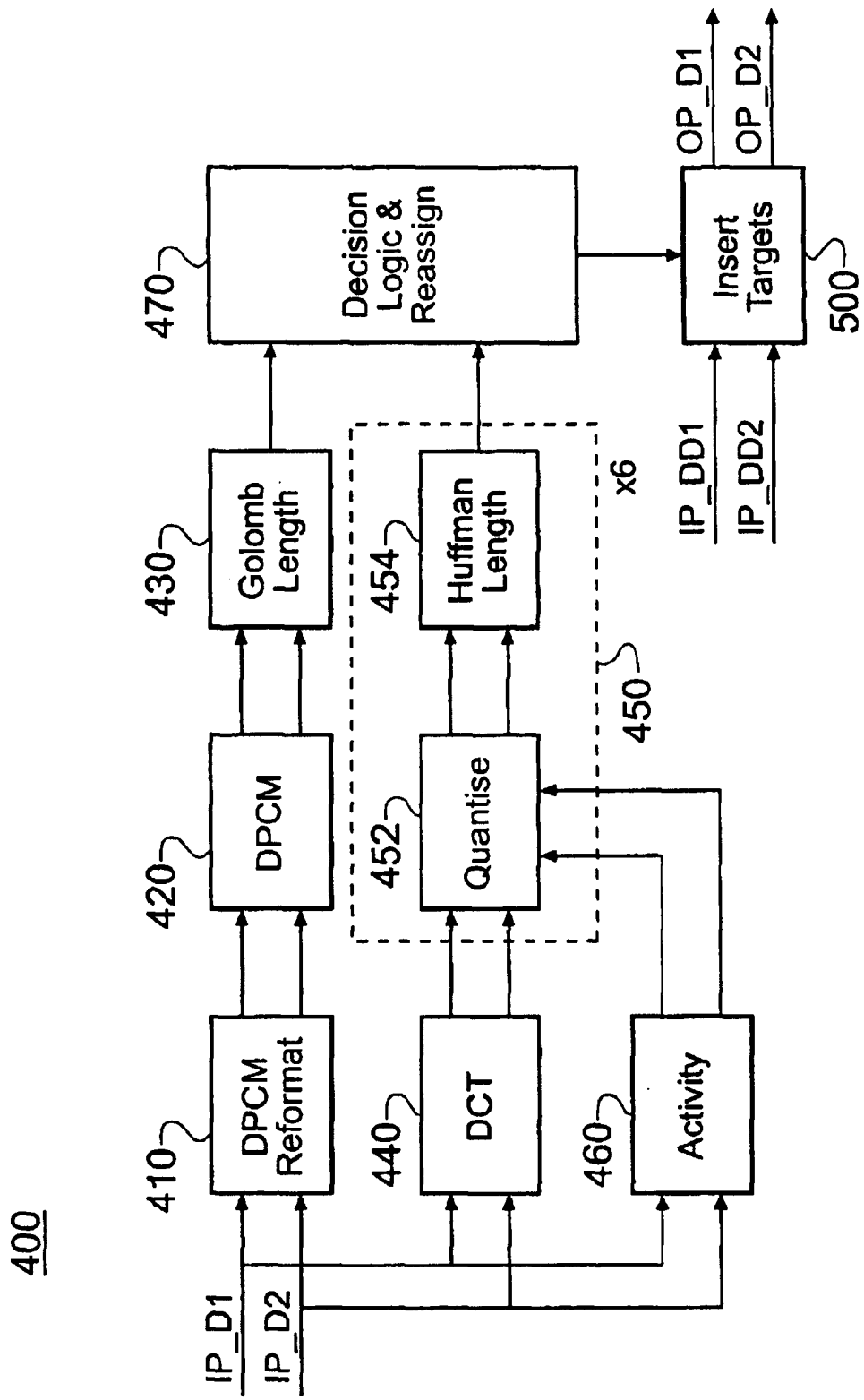
FIG. 7 schematically illustrates the bit allocation module of the encoder of FIG. 2.

$S_4$=number of occurrences of $DC_{[5:0]}$=xx x100 where "x" represents either 0 or 1. Effectively, the number of instances of the $DC_{[5:0]}$ being: divisible by 64 corresponds to the sum $S_0$; divisible by 32 (but not 64) corresponds to the sum $S_1$; divisible by 16 (but not 32) corresponds to the sum $S_2$; divisible by 8 (but not 16) corresponds to the sum $S_3$; and divisible by 4 (but not 8) corresponds to the sum $S_4$. FIG. 7 schematically illustrates how frequency of occurrence of particular $DC_{[5:0]}$ values is calculated.

In this embodiment the five sums $S_0$ to $S_4$ include all the DCT blocks from all video components. However, in alternative embodiments the sums $S_0$ to $S_4$ may be calculated separately for each component (RGB or YCbCr) and the final DCT_PRECISION decisions can be combined using, for example, a majority decision.

Once the sums $S_0$ to $S_4$ have been calculated, the DCT_PRECISION used at the previous generation is detected using four predetermined threshold values, $th_1$ to $th_4$, to produce the estimated value DCT_PREC_DETECTED. The following pseudocode defines the algorithm used:

| | |
|---|---|
| if ($S_0 > th_1 * S_1$) | DCT_PREC_DETECTED = 3 |
| else if ($S_0 + S_1 > th_2 * S_2$) | DCT_PREC_DETECTED = 2 |
| else if ($S_0 + S_1 + S_2 > th_3 * S_3$) | DCT_PREC_DETECTED = 1 |
| else if ($S_0 + S_1 + S_2 + S_3 > th_4 * S_4$) | DCT_PREC_DETECTED = 0 |
| else | Source Data |

The above algorithm assumes that DC_QUANT=8 (DC_PRECISION=00) in both the previous generation and in the current generation. Since Q(DC)=DC/DC_QUANT*$2^{DCT\_PREC}$ and DC_QUANT=8 if we detect a divisor of e.g. 8 on the DC data then we deduce that there was no further quantisation so that DCT_PREC_DETECTED=0 in the above algorithm. It will be appreciated that the algorithm should be adapted to take account of the value of DC_QUANT in both the previous and the current generation.

If the value of the sum $S_0$ is greater than the product of a threshold value $th_1$ and the sum $S_1$ then the detected divisor of DC data is 64=8*$2^3$ so the algorithm sets DCT_PREC_DETECTED=3 which corresponds to the most harsh DCT_PRECISION quantisation. If the value of ($S_0+S_1$) is greater than the product of a threshold value $th_2$ and the sum $S_2$ then the detected divisor of DC data is 32=8*$2^2$ so the algorithm sets DCT_PREC_DETECTED=2. If the value of ($S_0+S_1+S_2$) is greater than the product of a threshold value $th_3$ and the value of the sum $S_3$ then the detected divisor of DC data is 16=8*2 so the algorithm sets DCT_PREC_DETECTED=1. Finally, if the value of ($S_0+S_1+S_2+S_3$) is greater than the product of a threshold value $th_4$ and the value of the sum $S_4$ then the detected divisor of DC data is 8 so the algorithm sets DCT_PREC_DETECTED=0 which corresponds to the least harsh DCT_PRECISION quantisation. The threshold values for this particular embodiment are $th_1$=$th_2$=$th_3$=16 and $th_4$=2. The threshold values are determined empirically by performing calculations on test image sequences. This algorithm essentially quantifies the severity of the rounding effects on the pixel values in order to detect the previous value of the quantisation divisor DCT_PRECISION.

The DCT_PRECISION detection module outputs a "source"/"not source" signal that indicates whether or not the image data has previously undergone at least one encode/decode cycle and this signal is supplied as input to the bit allocation module 400 of FIG. 3 for use in calculation of target bit counts.

FIG. 7 schematically illustrates the bit allocation module 400 of FIG. 2. This module has three main functions: firstly it selects the encoding mode for each Macro-Block from the two available alternatives of lossless DPCM and lossy DCT encoding; secondly it calculates a target number of bits MB_TARGET for each Macro-Block from a similar target for the associated Macro-Block Unit that is in turn calculated from the required target bit rate for the system; and thirdly is calculates a Q_SCALE value Q_BASE defined to be the starting scale for a binary search that is performed by the binary search module 700. The binary search module determines a Q_SCALE value Q_ALLOC, which is obtained using a higher resolution Q_SCALE search than that used to obtain the value Q_BASE.

The shuffled output image data signals S_OP_D1 and S_OP_D2 from the shuffling unit 100 are supplied as input to the bit allocation module 400. These input signals comprise raster scanned $8_H×8_V$ DCT blocks of 12-bit video samples. The final DCT_PRECISION and Q_START values produced by the parameter estimation circuit ^^ are also supplied as input to the bit allocation module 400. The bit allocation module 400 comprises a DPCM reformat module 410; a DPCM module 420; a Golomb length module 430; a DCT module 440, a lossy encoding module 450 having a quantisation module 452 and a Huffman length module 454; an activity module 460; and a decision logic unit 470. The decision logic unit 470 supplies input to the target insertion module 500.

The bit allocation module 400 makes encoding decisions based on the trial encoding of a Macro-Block Unit, which for this embodiment consists of 204 MBs. The encoding mode decision between lossless DPCM and lossy DCT is made on the basis of a single DPCM encoding stage (performed in combination by the DPCM reformat module 410, the DPCM module 420 and the Golomb length module 430) and on the basis of 6 DCT trial encoding stages involving a single discrete cosine transform in the DCT module 440 followed by six cycles through the lossy encoding unit 450. The activity module 460 is operable to adjust the quantisation divisors that are applied to the data by the quantisation module 452. The calculations performed by the activity module 460 are described in detail below.

The decision logic unit 470 is supplied with the output of the Golomb Length module 430 which is the entropy encoding stage of DPCM encoding and is also supplied with the output of the Huffman length module 454 which is the entropy encoding stage of DCT quantisation encoding. The decision Logic unit 470 compares the results for the DPCM trial encoding and the DCT trial encoding. Lossless DPCM is selected for a Macro-Block if, and only if, it results in a lower overall bit count. The decision logic unit 470 is also operable to calculate the target bit count targets for both the Macro-Block Units and Macro-Blocks.

The Activity module 460, which is part of the DCT mode encoding circuitry, is used to calculate an activity measure based on the pixel variance of image blocks. It is known that harsher quantisation is less perceptible to the viewer in image blocks which have higher activity levels. The quantisation step for each block can be offset by suitably adjusting the Q_SCALE quantisation divisor used in the quantisation module 452 of the bit allocation module 400 so that higher activity blocks are quantised more harshly. As we shall explain later below, the Q_SCALE_CODEs that are used for the bit allocation process depend on whether we have "activity off" or "activity on". Furthermore the activity factor NORM_ACT appears in the denominator of the formula for the quantisation of the AC DCT coefficients Q(AC) above.

Activity is calculated only once for each Macro-Block. Values of a parameter INTRAMAD are calculated for each $8_H \times 8_V$ DCT block in Macro-Block: for luminance (Y) DCT blocks only in YCbCr mode and for R, G and B DCT blocks in RGB mode. IntraMAD is defined as follows:

$$INTRAMAD[j] = \sum_{i=1}^{64} |dct[i, j] - dct\_dc[j]|/64$$

where dct[i, j] is the pixel value of pixel i in DCT block number j. The parameter dct_dc[j] is the mean value of dct[i, j] for the $8_H \times 8_V$ DCT block (and for a given signal component) and it is given by the formula:

$$dct\_dc[j] = \left(\sum_{i=1}^{64} dct[i, j]\right)/64$$

The minimum VALUE OF INTRAMAD for all of the Y or RGB DCT blocks in the Macro-Block is calculated as follows:

$$MINMAD = \min_{j=1}^{n}(INTRAMAD[j])$$

and the activity, ACT is given by:

$ACT=1+MinMAD$

Since values for ACT range from 1 to several thousand the activity is normalised so that it lies within a predetermined range. In this embodiment ACT is normalised using previous Macro-Block Unit data to give a normalised activity measure NORM_ACT that lies in the range 0.5 to 2:

$NORM\_ACT=(2.ACT+AVG\_ACT)/(ACT+2.AVG\_ACT)$, where AVG_ACT=Average of ACT from previous MBU.

At the start of an image sequence or if a scene change has been detected (using a standard method) a default value DEFAULT_AVG_ACT that depends on Q_START and DCT_PRECISION is used instead of AVG_ACT. For the first MBU in any frame (except for the first frame in the sequence), a value FRM_AVG_ACT given by the average of ACT for all MBUs in previous frame is used in place of AVG_ACT. Although for this embodiment the activity is normalised to lie in the range 0.5 to 2.0, in alternative embodiments it may be normalised to any range p/q to q/p using the following general equation:

$NORM\_ACT=(q.ACT+p. AVG\_ACT)/(p.ACT+q.AVG\_ACT)$

So that for the selected NORM_ACT range of 0.5 to 2.0, the parameters p and q have the values 1 and 2 respectively.

To increase repeatability over multiple generations of encoding, NORM_ACT is constrained to a fixed number of levels. For the given range of 0.5 to 2, NORM_ACT is constrained to the 8 levels {4/8, 5/8, 6/8, 7/8, 1, 4/3, 5/3, 2}.

Figure 8:
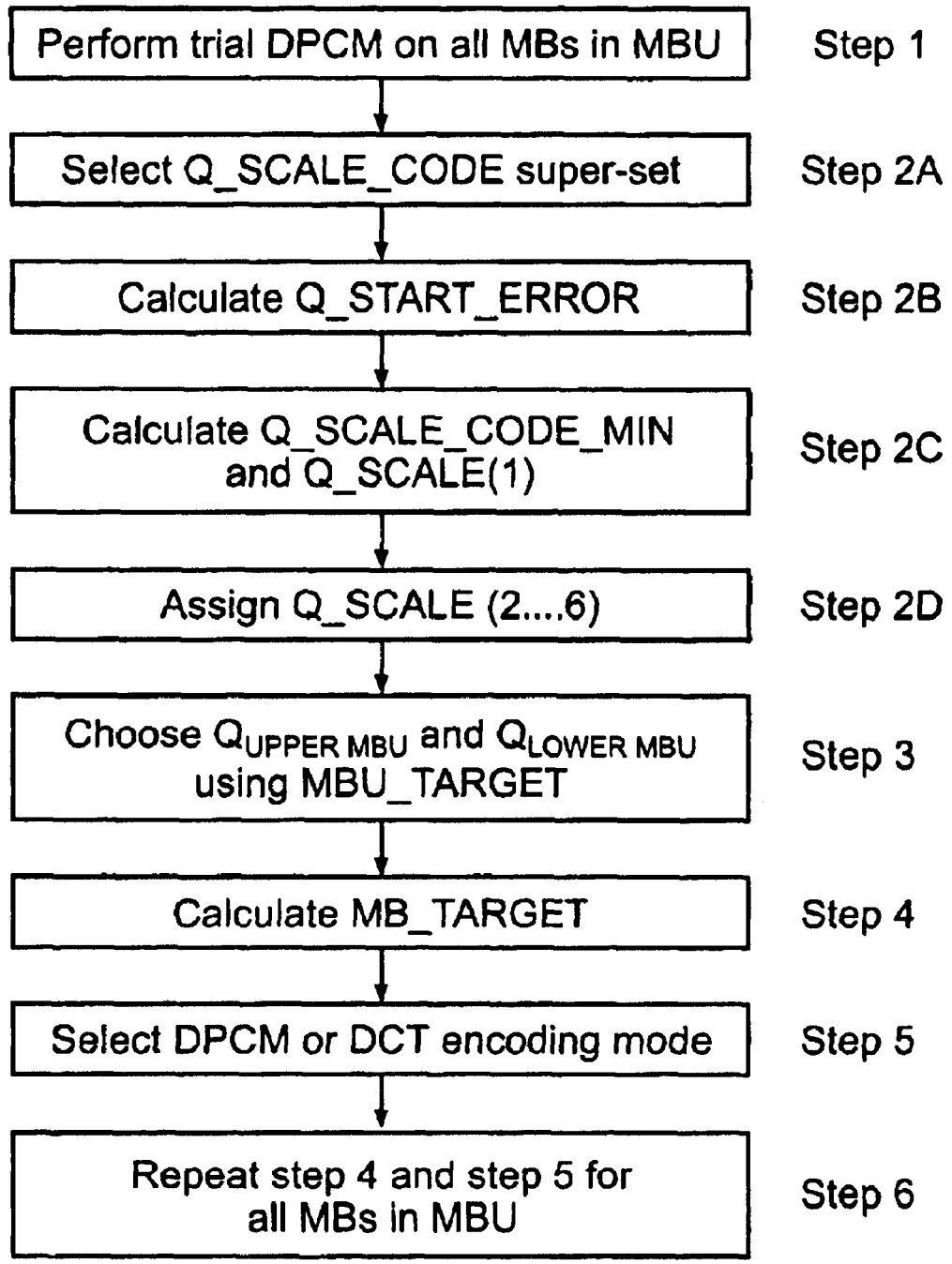
FIG. 8 is a flow chart showing calculations performed by the bit allocation module of FIG. 7.

FIG. 8 is a flow chart representing the algorithm implemented on each MBU by the bit allocation module according to embodiments of the invention. Step 1 is performed in combination by the DPCM reformat module 410, the DPCM module and the Golomb length module. Steps 2A to 2D are performed by the quantise module 452 and Steps 3, 4 and 5 are performed by the decision Logic module 470.

Step 1 involves performing one stage of lossless DPCM trial encoding on all MBs in the MBU to determine for each MB the number of bits, MB_DPCM_BITS, produced by DPCM encoding.

Step 2A involves performing 6 stages of lossy DCT encoding on all MBs within the MBU to determine for each block and for each of 6 quantisation divisors Q_SCALE(1 . . . 6), the number of bits MB_DCT_BITS (Q_SCALE) produced by lossy DCT encoding the MB. Each value of Q_SCALE value is specified by one of 31 Q_SCALE_CODES in combination with a Q_SCALE_TYPE that is either linear or non-linear. Rather than performing a complete scan of the full range of Q_SCALE quantisation divisors associated with the 31 available Q_SCALE_CODES, a subset (SS) of Q_SCALE_CODES is selected. The SS is defined by taking into account both the value of DCT_PRECISION and whether activity is on or off. For example for a DCT_PRECISION=1, with activity off the subset is given by:

SS=[2, 3, 5, 7, 10, 15, 22, 31]

whereas with activity on (NORM_ACT is in range 0.5–2 in this case), the subset is given by:

SS=[2, 3, 5, 7, 10, 15]

Table 1 below shows the bit allocation subset used in this embodiment of the invention for each value of DCT_PRECISION for both "activity on" and "activity off".

TABLE 1

| Subset of Q_SCALE_CODES for Bit Allocation | | | | | | | | |
|---|---|---|---|---|---|---|---|---|
| DCT_PRECISION | 0 | | 1 | | 2 | | 3 | |
| Activity | Off | On | Off | On | Off | On | Off | On |
| ss (0) | 4 | — | 2 | 2 | 1 | 1 | 1 | 1 |
| ss (1) | 6 | — | 3 | 3 | 2 | 2 | 2 | 2 |
| ss (2) | 10 | — | 5 | 5 | 3 | 3 | 3 | 3 |
| ss (3) | 15 | — | 7 | 7 | 5 | 5 | 5 | 5 |
| ss (4) | 22 | — | 10 | 10 | 7 | 7 | 7 | 7 |
| ss (5) | 31 | — | 15 | 15 | 11 | 11 | 11 | 11 |
| ss (6) | — | — | 22 | — | 15 | 15 | 15 | 15 |
| ss (7) | — | — | 31 | — | 22 | — | 22 | — |
| ss (8) | — | — | — | — | 31 | — | 31 | — |
| Q_start_error | 24 | | 12 | | 6 | | 3 | |

The 6 Q_SCALES used for the trial quantisation correspond to the quantisation divisors associated with 6 of the Q_SCALE_CODES from the appropriate SS. Note that each SS will typically comprise more than 6 Q_SCALE_CODEs. The value of Q_START is used to select the 6 particular Q_SCALE_CODES from the subset to be used for the trial quantisation procedure.

The lowest allowable Q_SCALE_CODE in the subset is the code that represents the quantisation factor MINIMUM_Q where:

$$\text{MINIMUM\_Q} = 2^{(DCT\_PRECISION)}$$

or if this code does not exist then the lowest allowable Q_SCALE_CODE is the lowest Q_SCALE-CODE that represents a number greater than the MINIMUM_Q.

Step 2B involves a calculation of the error in Q_START which is related to the value of DCT_PRECISION and is given by:

$$Q\_START\_ERROR = 24/(3 - 2^{DCT\_PRECISION})$$

so for values of DCT_PRECISION where quantisation is less harsh the error in Q_START is greater.

Step 2C involves calculating Q_SCALE_MIN that is given by Q_START minus Q_START_ERROR and obtaining the Q_SCALE_CODE, Q_SCALE_CODE_MIN that is associated with Q_SCALE_MIN from the look-up table of FIG. 4. The closest Q_SCALE_CODE in the subset that is less than or equal to Q_SCALE_CODE_MIN is identified and the quantisation divisor associated with that Q_SCALE_CODE is defined to be the first of the six trial quantisation parameters i.e. Q_SCALE(1). If however there is no Q_SCALE_CODE in the subset that is less than or equal to Q_SCALE_CODE_MIN then Q_SCALE(1) is set to the quantisation factor associated with the lowest Q_SCALE_CODE in the subset.

Step 2D involves assigning the remaining five trial quantisation factors Q_SCALE(2) to Q_SCALE(6) to the quantisation scales represented by the five next contiguous Q_SCALE_CODES in the subset that are higher than Q_SCALE(1). If there are insufficient Q_SCALE_CODES in the subset to allow this, then Q_SCALE(6) is set to the uppermost Q_SCALE_CODE in the subset and the values Q_SCALE(1 . . . 5) are set to the next 5 Q_SCALE_CODES from the subset below Q_SCALE(6).

Step 3 involves performing the six trial DCT quantisations and summing the values of MB_DCT_BITS(Q_SCALE) over all of the Macro-Blocks in a Macro-Block Unit to produce the value MBU_DCT_BITS(Q_SCALE) for each of the 6 Q_SCALES. A bit count target for each MBU is calculated from a predetermined FRAME_TARGET defined for each image frame (or field) such that:

$$\text{MBU\_TARGET} = \text{FRAME\_TARGET}/40.$$

Figure 9:
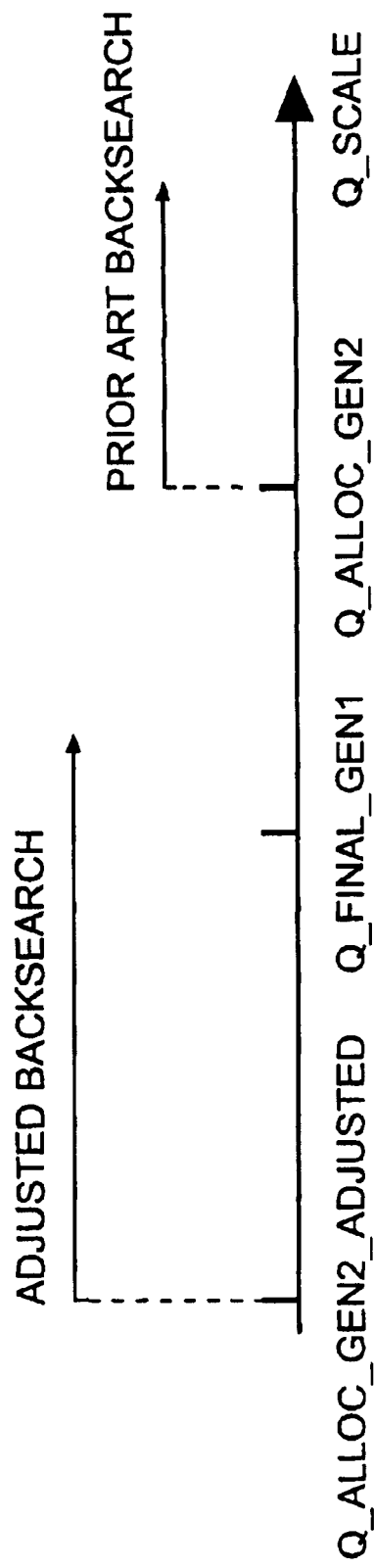
FIG. 9 schematically illustrates an advantage of the adjusted backsearch according to embodiments of the invention.

In known systems the FRAME_TARGET is based entirely on the required encoding bit rate. However embodiments of the invention assign the FRAME_TARGET in dependence upon both the required encoding bit rate and whether the video data is "source" or "not source". If the input data is determined to be "source" data then the required encoding bit rate is artificially reduced by adjusting it downwards by a small amount so that the FRAME_TARGET for "source" data is also effectively adjusted downwards. In this embodiment the downwards adjustment is 2.5%. As a consequence of preferentially reducing the FRAME_TARGET for "source" input data the Macro-Block target bit count calculated by the bit allocation module for that source data will be reduced so that Q_ALLOC (calculated by the binary search module 700) for the $1^{st}$ generation Q_ALLOC_GEN1 will increase giving slightly harsher final quantisation Q_FINAL_GEN1 for the $1^{st}$ reproduced image than would be the case without FRAME_TARGET reduction. However the slight reduction in quality of the $1^{st}$ generation image is offset by the advantage gained for subsequent compression/decompression of the reduced FRAME_TARGET image data. The $2^{nd}$ and higher generation encoding of this data will involve unadjusted FRAME_TARGETs. The $2^{nd}$ generation adjusted value Q_ALLOC_GEN2_ADJUSTED is much more likely than the unadjusted value Q_ALLOC_GEN2 to be less than Q_FINAL_GEN1. This is illustrated by FIG. 9 which shows that the prior art backsearch starting point misses Q_FINAL_GEN1 whereas the adjusted backsearch i.e. backsearch arising from adjustment of the $1^{st}$ generation FRAME_TARGET includes Q_FINAL_GEN1 in its trial Q_SCALE range. Accordingly the adjusted backsearch process will be more likely to find Q_FINAL_GEN2=Q_FINAL_GEN1 which gives the best possible image quality for $2^{nd}$ (and higher) generations. Note that during encoding of $2^{nd}$ generation input data the required bit rate of the $1^{st}$ generation encoding will not necessarily be known.

The set of six values of MBU_DCT_BITS(Q_SCALE) are compared to MBU_TARGET and the two values $B_U^{MBU}$ and $B_L^{MBU}$ of MBU_DCT_BITS(Q_SCALE) that lie just above and just below the MBU_TARGET respectively are defined as follows:

$$B_U^{MBU} = \text{MBU\_DCT\_BITS}(Q\_SCALE(n)) > \text{MBU\_TARGET}$$

$$B_L^{MBU} = \text{MBU\_DCT\_BITS}(Q\_SCALE(n+1)) <= \text{MBU\_TARGET}$$

Figure 10A:
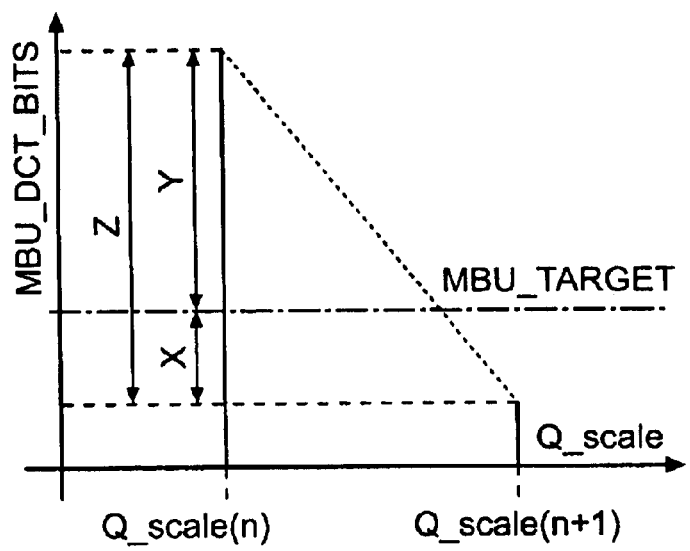
FIG. 10A is an illustrative graph of MBU_DCT_BITS against Q_SCALE.

FIG. 10A is an illustrative graph of MBU_DCT_BITS against Q_SCALE and shows the two bit count values $B\_L^{MBU}$ and $B\_U^{MBU}$ that correspond to the Q_SCALE codes Q_SCALE(n) and Q_SCALE(n+1) respectively. Note that the smaller quantisation divisor Q_SCALE(n) gives a higher bit count than the larger quantisation factor Q_SCALE(n+1). Some properties of this "Bits versus Q_SCALE" graph for the macroblock unit will be used to derive a target bit count MB_TARGET for each MB belonging to the MBU. In particular, FIG. 9A shows the quantities X, Y and Z which are defined as follows:

$$X = \text{MBU\_TARGET} - B\_U^{MBU};$$

$$Y = B\_L^{MBU} - \text{MBU\_TARGET; and}$$

$$Z = B\_L^{MBU} = X + Y$$

so that $$MBU\_TARGET = (B\_L^{MBU}X + B\_U^{MBU}Y)/Z.$$

Accordingly in Step 4 of FIG. 8 the MB_TARGET is calculated as follows:

$$MB\_TARGET = X * MB\_DCT\_BITS(Q\_SCALE(n))/Z + Y * MB\_DCT\_BITS(Q\_SCALE(n+1))/Z$$

and if Z=0 division by zero is avoided by simply setting MB_TARGET=MB_DCT_BITS(Q_SCALE(n)).

In Step 5 a decision is made between lossless DPCM encoding and lossy DCT encoding for each MB in the MBU by comparing MB_DPCM_BITS to MB_TARGET. If MB_DPCM_BITS is greater than MB_TARGET then lossy DCT encoding is selected for the macroblock. If however MB_DPCM_BITS is less than or equal to MB_TARGET then the lossless DPCM encoding mode is selected for the macroblock. Each time lossless DPCM encoding is selected for a MB then MBU_TARGET is recalculated such that MBU_TARGET=MBU_TARGET−MB_DPCM_BITS. Also, MBU_DCT_BITS(Q_SCALE(n)) and MBU_DCT_BITS(Q_SCALE(n+1)) are recalculated as follows:

$$MBU\_DCT\_BITS(Q\_SCALE(n)) = MBU\_DCT\_BITS(Q\_SCALE(n)) - MB\_DCT\_BITS(Q\_SCALE(n));$$

MBU_DCT_BITS(Q_SCALE(n+1))=MBU_DCT_BITS(Q_SCALE(n+1))-MB_DCT_BITS(Q_SCALE(n+1)).

Since MBU_TARGET is recalculated in Step 5, the MB_TARGETS have to be recalculated taking account of the number of MBs currently assigned to lossy DCT mode encoding. Step 4 and Step 5 are repeated for all lossy DCT mode MBs until no more MBs switch to DPCM encoding mode in Step 5. Typically 5 or 6 iterations of Steps 4 and 5 are sufficient to achieve this.

It is necessary to consider situations where an inaccurate estimate for Q_START means that the appropriate quantisation divisor Q_SCALE lies outside the bit allocation search range (comprising 6 Q_SCALES). In such cases an alternative strategy to that of Steps 3 and 4 above is required in order to calculate MB_TARGET. There are two possible scenarios to consider.

Firstly, if in step 3 MBU_DCT_BITS(Q_scale(n)) is less than or equal to MBU_target for all 6 values of n, indicating that the quantisation is too harsh for all trial values, then MB_TARGET in step 4 is calculated as follows:

$$MB\_TARGET = \frac{MB\_DCT\_BITS(Q\_SCALE(1)) \times MBU\_TARGET}{MBU\_DCT\_BITS(Q\_SCALE(1))}$$

Figure 10B:
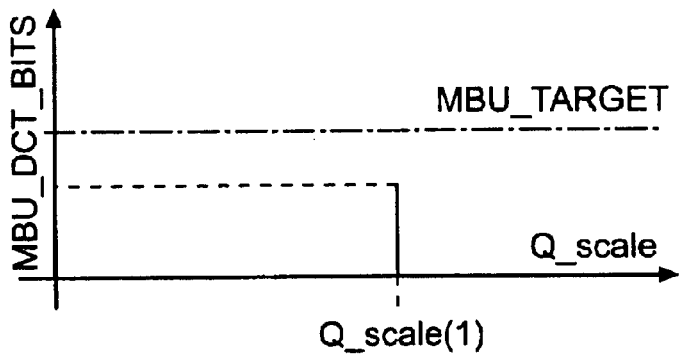
FIG. 10B is a graph of MBU_DCT_BITS against Q_SCALE in a case where quantisation is too harsh for all 6 trial quantisation values.

This first scenario is illustrated by FIG. 10B.

Figure 10C:
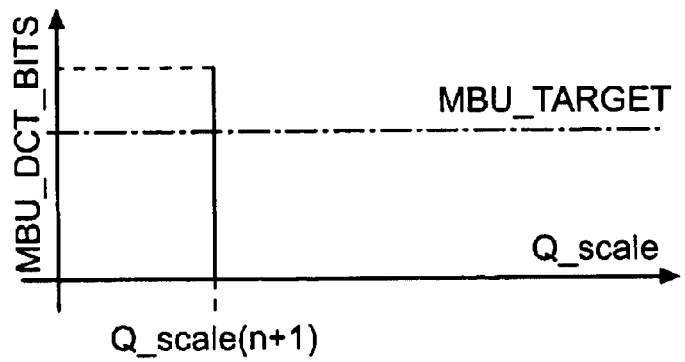
FIG. 10C is a graph of MBU_DCT_BITS against Q_SCALE in a case where quantisation is not harsh enough for any of 6 trial quantisation values.

Secondly, if in step 3, the value MBU_DCT_BITS(Q_SCALE(n+1)) is greater than MBU_target for all 6 values of n, indicating that the quantisation is not harsh enough for any of the 6 trial values, then Q_SCALE(5) and Q_SCALE (6) are selected as Q_SCALE(n) and Q_SCALE(n+1) in step 3. In this case Step 4 remains unchanged, but now has the effect of extrapolating MB_TARGET. This second scenario is illustrated by FIG. 10C.

In addition to calculating MB_TARGETS, the bit allocation module 400 sets the value of Q_BASE which is the starting Q_SCALE for the binary search. The Q_SCALE value $Q_{BASE}$ is determined from MB_TARGET using the appropriate MB_DCT_BITS versus Q_SCALE curve. If we have a 5 stage binary search, as in this embodiment, then $Q_{BASE}$ is simply the Q_SCALE given by Q_SCALE_CODE=16 (i.e. the midpoint of the quantiser table). Thus the binary search can cover the whole range of Q_SCALE by starting at this Q_BASE. However, in alternative embodiments which use fewer binary search stages, Q_BASE is set midway between Q_SCALE(n) and Q_SCALE(n+1) for each Macro-Block. For only those macro-Blocks assigned to lossy DCT mode encoding, the values of $Q_{BASE}$ and MB_TARGET are output by the Decision logic unit 470 and added to the bitstream comprising the image data IP_DD1 and IP_DD2 that has been delayed by one MBU by the target insertion module 500. The values MB_TARGET and $Q_{BASE}$ are supplied to the binary search module which uses them in determining the final Q_SCALE.

Figure 11:
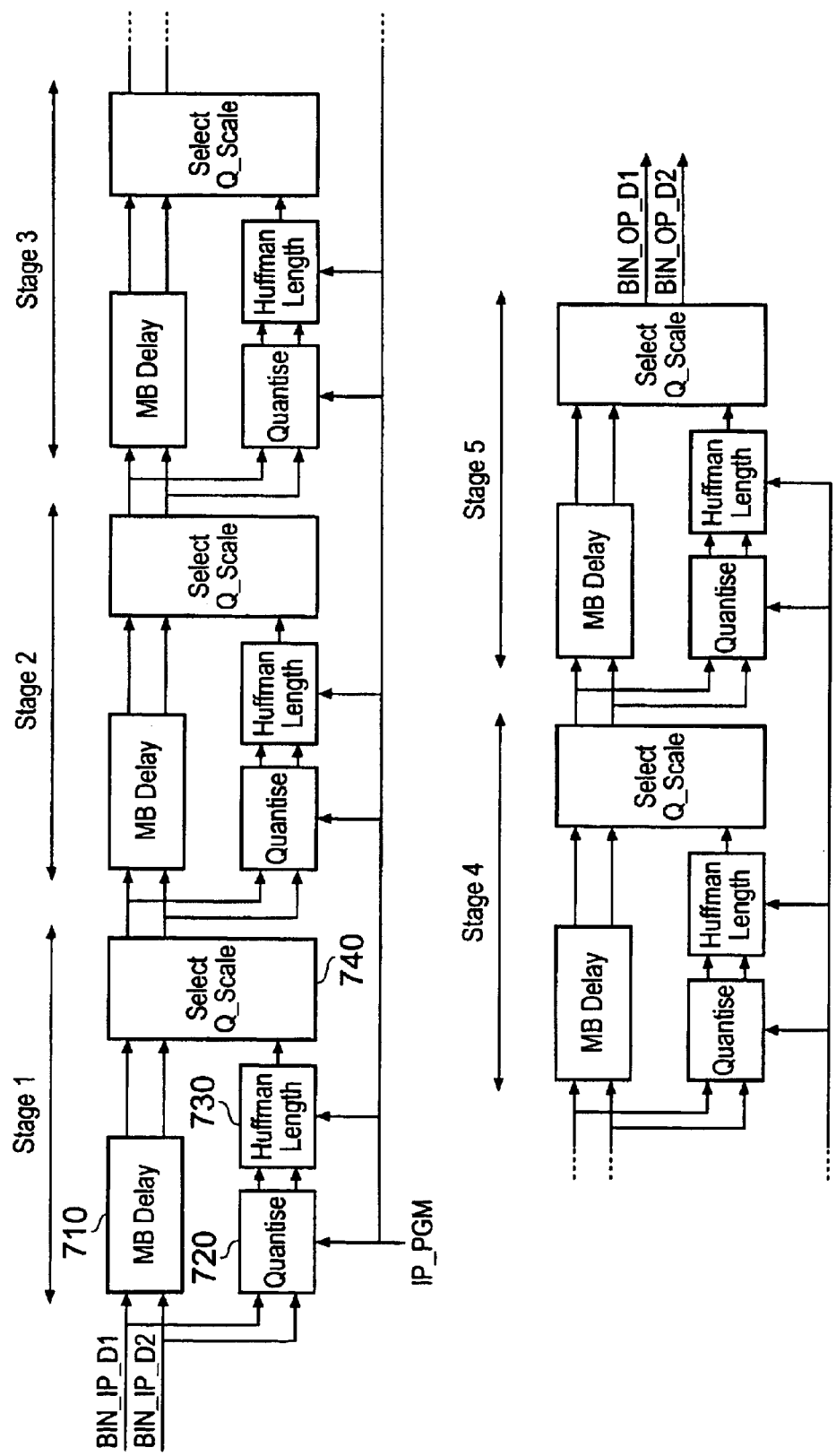
FIG. 11 schematically illustrates the internal structure of a binary search module of the encoder of FIG. 3.

FIG. 11 schematically illustrates the internal structure of the binary search module 700. The binary search module comprises 5 units, one unit for each stage of the binary search. Each unit comprises a MB delay module 710, a quantisation module 720, a Huffman length calculation module 730 and a Q_SCALE selection module 740.

The binary search module 700 receives two input signals BIN_IP_D1 and BIN_EP_D2 comprising discrete cosine transformed Macro-Block data together with the values of MB_TARGET and $Q_{BASE}$ calculated by the bit allocation module 400. The signals BIN_IP_D1 and BIN_IP_D2 are supplied to the MB Delay module 710 that delays the input data by one Macro-Block between each of the five stages of the binary search process. The signals BIN_IP_D1 and BIN_IP_D2 are also supplied to the quantisation module 720 that outputs data to the length calculation module 730 which performs Huffman entropy encoding. Each stage of the binary search algorithm involves a cycle through a quantisation module 720 and a Huffman length calculation module 730. The Huffman length module 730 calculates the bit length required to encode the DCTed and quantised Macro-Block. The quantisation module 720 and the Huffman length calculation module 730 in each of the 5 units are supplied with an input signal IP_PGM comprising quantiser weighting matrix data which is used to vary the quantisation of each sample depending on its position in the $8_H \times 8_V$ DCT block and Huffman length AC variable length coding tables which give the bit length for each Table/Group combination. In this embodiment hardware requirements are reduced by using a single RAM to store the Quantiser Weighting Matrices for all five binary search stages. However separate RAMs are required for the VLC data tables they must be randomly accessible for each stage.

The delayed input data from the MB delay unit 710 and the output of the length calculation module are supplied as inputs to the Q_SCALE selection module that selects the next Q_SCALE value to test for the Macro-Block and passes on the selected Q_SCALE value to the subsequent stage of the binary search. The final Q_SCALE value is selected by the Q_SCALE selection module of the fifth binary search unit and this is denoted Q_ALLOC. Q_ALLOC is the smallest Q_SCALE value that does not exceed the MB_TARGET for the Macro-Block. The Q_ALLOC value is supplied to the back search module 800 for further processing along with the final output signals BIN_OP_D1 and BIN_OP_D2. Note that the output signals BIN_OP_D1 and BIN_OP_D2 are delayed by a total of five Macro-Blocks with respect to the input signals BIN_IP_D1 and BIN_IP_D2.

Figure 12:
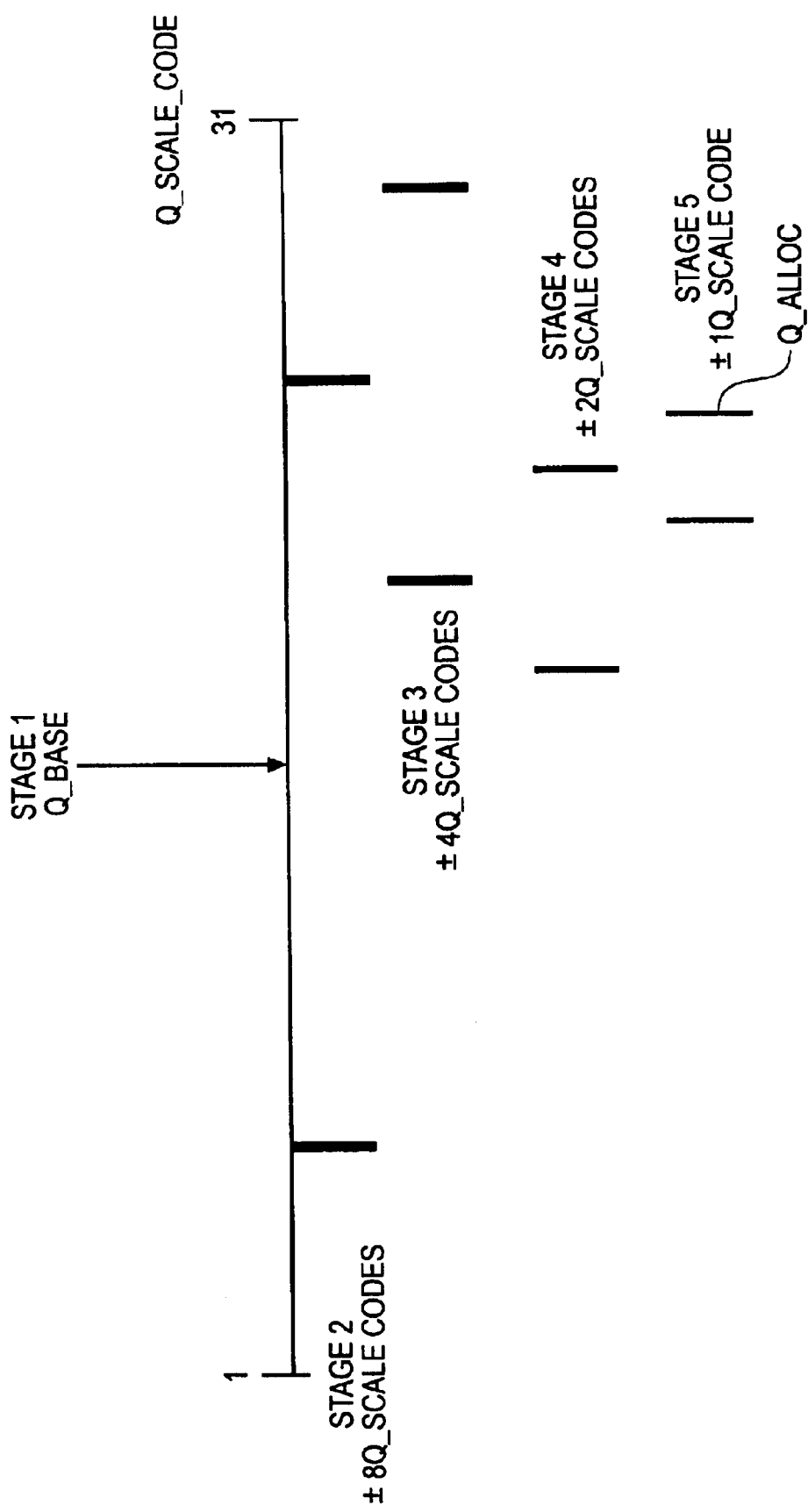
FIG. 12 is an illustrative example of a 5 stage binary search performed by the apparatus of FIG. 11.

FIG. 12 schematically illustrates the 5 stage binary search procedure.

Stage 1 of the binary search quantises the input data using the value Q_BASE, calculated by the bit allocation module 400 to determine a starting Q_SCALE_CODE for the binary search denoted Q_BASE_CODE. In this embodiment the binary search has 5 stages which search the whole range of Q_SCALE. Therefore Q_BASE is always set at the centre of this range corresponding to a Q_SCALE_CODE of 16. The quantised data is then passed to the length calculation module 730. If the stage 1 data length returned by the length calculation module 730 is greater than the MB_TARGET then the Q_SCALE value is increased by eight steps of Q_SCALE_CODE for the next binary search stage; otherwise the value is decreased by eight steps of Q_SCALE_CODE. In this case the Q_SCALE value is increased by 8 steps at stage 2. The input data is delayed by one Macro-Block, to align it for the next stage.

At Stage 2 the data is quantised using the value Q_SCALE_CODE=(Q_BASE_CODE+8) and stage 2 length is calculated. This stage 2 data length is compared to the MB_TARGET and the Q_SCALE is either increased or decreased by four steps of Q_SCALE_CODE for the third stage. In this case the Q_SCALE value is decreased by 4 steps at stage 3. There is a second MB delay to align the input data for stage 3.

At Stage 3 the data is quantised using the value Q_SCALE_CODE=(Q_BASE_CODE+8−4) and a stage 3 data length is calculated. This stage 3 data length is compared to the MB_TARGET and the Q_SCALE is either increased or decreased by two steps of Q_SCALE_CODE for the fourth stage. In this case the Q_SCALE value is increased by 2 steps at stage 4. There is a third MB delay to align the input data for stage 4.

At Stage 4 the data is quantised using the value Q_SCALE_CODE=(Q_BASE_CODE+8−4+2) and a stage 4 length is calculated. This stage 4 data length is compared to the MB_TARGET and the Q_SCALE is either increased or decreased by one step of Q_SCALE_CODE for the fifth stage. In this case the Q_SCALE value is increased by 1 step at stage 5. There is a fourth MB delay to align the input data for stage 5.

At Stage 5 the data is quantised using the value Q_SCALE_CODE=(Q_BASE_CODE+8−4+2+1) and a stage 5 length is calculated. This stage 5 data length is compared to the MB_TARGET and the Q_SCALE. If the stage 5 data length is greater than the MB_TARGET, then the Q_SCALE is increased by one Q_SCALE_CODE. Otherwise, Q_SCALE is not changed. In this case the Q_SCALE is not changed. In this way, the binary search algorithm selects the smallest Q_SCALE value that does not exceed the MB_TARGET for the Macro-Block. This Q_SCALE value is known as Q_ALLOC.

At each stage of binary search, any decision to decrease the Q_SCALE is subject to the condition of MINIMUM_Q. The lowest allowable Q_SCALE_CODE is the Q_SCALE_CODE representing the MINIMUM_Q (or if this does not exist, the first Q_SCALE_CODE representing a number greater than the MINIMUM_Q), where:

$$MINIMUM\_Q = 2^{(3-DCT\_PRECISION)}$$

If the decrease in Q_SCALE would take it below the lowest allowable Q_SCALE_CODE, then it is instead set equal to the lowest allowable Q_SCALE_CODE prior to the next stage of binary search.

Figure 13:
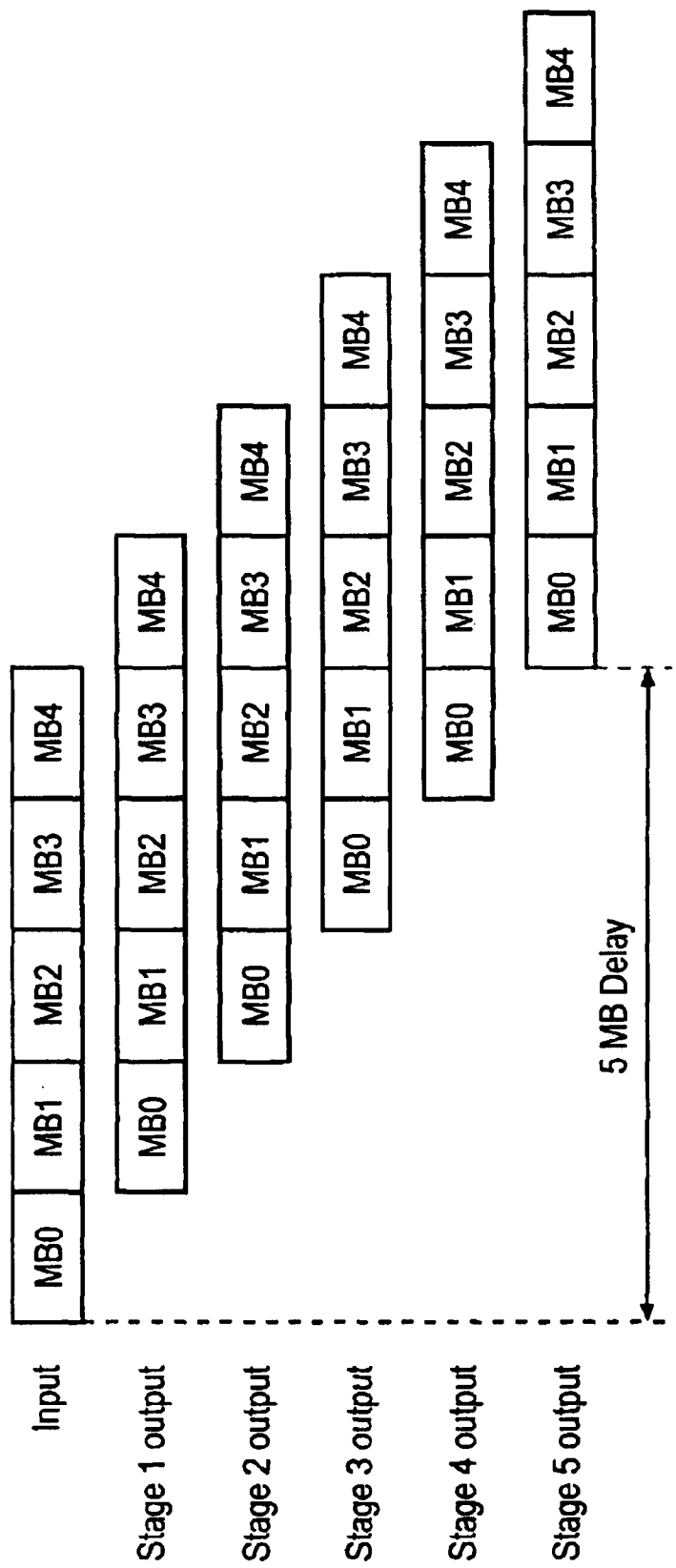
FIG. 13 schematically illustrates the Macro-Block delay at each stage of the binary search of FIG. 12.

FIG. 13 schematically illustrates the timing of the input and output Macro-Blocks for each binary search stage in this module. The final output is from "stage 5".

For Macro-Blocks encoded in Lossless mode (DPCM), the binary search module 700 operates in BYPASS mode. In BYPASS mode, the Q_SCALE change normally implemented at the end of each binary search stage is disabled. This produces output data identical to the input data to the module.

Figure 14:
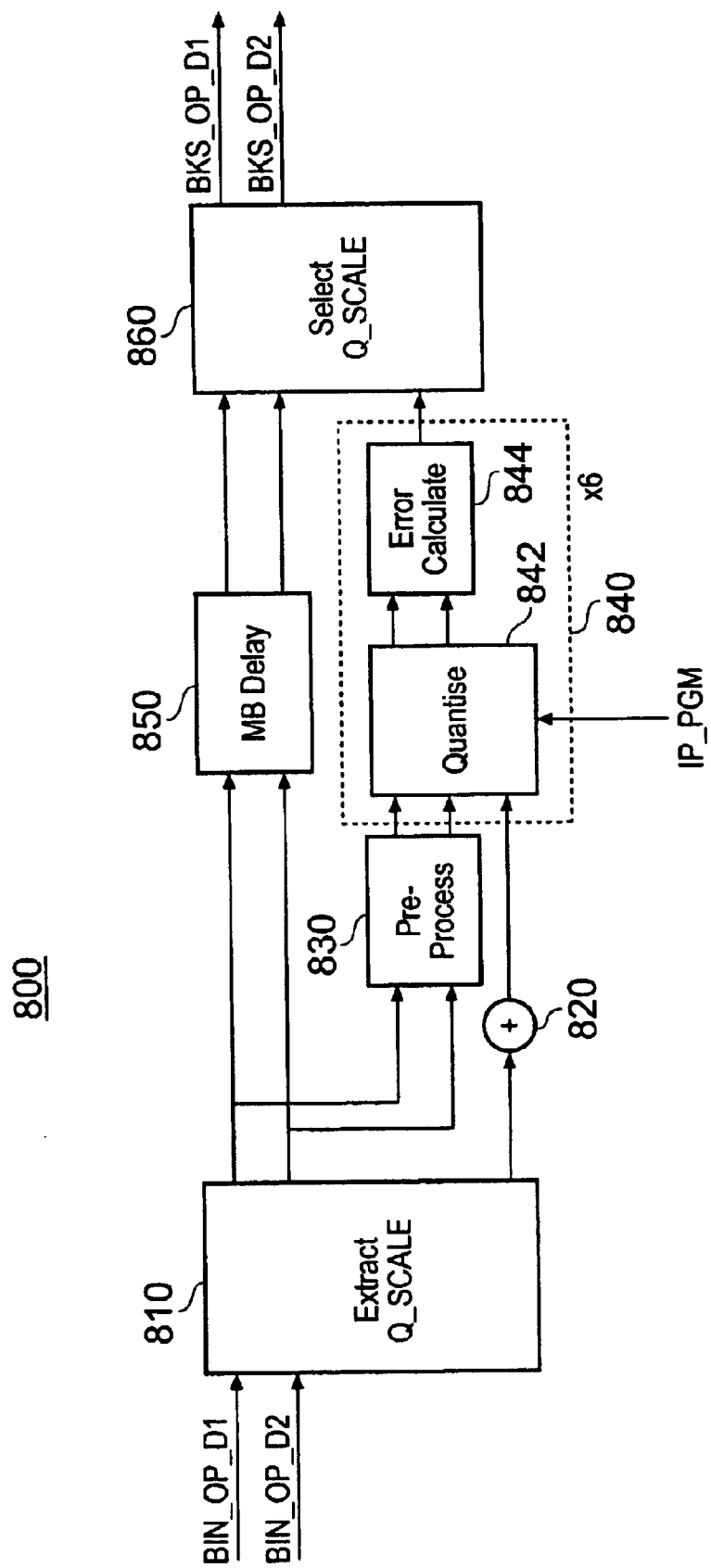
FIG. 14 schematically illustrates the backsearch module of the encoder of FIG. 3.

FIG. 14 schematically illustrates the internal structure of the back search module 800. This module comprises: a Q_SCALE extraction circuit 810; a Q_SCALE incrementer 820; a pre-processor 830; six quantiser units 840, each of which comprises a quantise module 842 and an error calculation module 844; a Macro-Block delay unit 850; and a Q_SCALE selection module 860.

The inputs to the back search module 800 comprise the output signals BIN_OP_D1 and BIN_OP_D2 of the binary search module 700. This input data includes a value Q_ALLOC for each MB. The Q_SCALE extraction module 810 extracts the Q_SCALE value Q_ALLOC from the input bit-stream and this value is used as the first quantiser scale tested in the backsearch procedure. Each quantiser unit tests two quantiser scales. The Q_SCALE extraction module 810 outputs the Q_ALLOC values to the incrementer 820 where they are incremented by one Q_SCALE_CODE step to give a second quantiser scale to be tested by the quantiser unit and this second value is supplied as input to the quantise module 842 of the quantiser unit 840. The MB data output by the Q_SCALE extraction module 810 is supplied to the MB delay unit where it is delayed by one MB before being supplied as input to the Q_SCALE selection module 860. The MB data from the Q_SCALE extraction module is further supplied to the pre-processor 830 where the first 31 of the 63 AC DCT coefficients are repeated such that they occur twice for each DCT block. The output from the pre-processor 830 is supplied to each of six quantisation units 840. Each of these quantisation units 840 is used to estimate the quantisation error at two distinct quantiser levels. This two quantiser level per unit calculation is possible because only 31 of the AC DCT coefficients are used in the error calculation. In this embodiment the first 31 AC DCT coefficients are used for the error calculation although alternatively the second 31 coefficients could be used. The quantise module 842 quantises the first 31 AC DCT coefficients using a first quantisation divisor and quantises the second 31 AC DCT coefficients using a second quantisation divisor.

A range of quantisation divisors are tested by the six quantisation units 840, starting with a Q_SCALE=Q_ALLOC and incrementing the Q_SCALE by one Q_SCALE-CODE step at a time, up to a total of 12 quantiser scales. Each quantise module 842 receives the input signal IP_PGM comprising quantiser weighting matrix data that varies the quantisation of each sample depending on its position in the $8_H \times 8_V$ block. The quantise module 842 outputs quantised data to the error calculation module 844 which calculates the residual error associated with the quantisation that has been performed.

As a result of the quantisation process each quantised DCT coefficient has an associated residual error value, which depends on: the remainder after the division; the total divisor used in the quantiser; and the rounding applied to the result. Any DCT coefficient, C, can be expressed as a combination of the total divisor, q, the residual, r, and an integer, n as follows:

$$C = n*q + r$$

After quantisation the coefficient is either rounded down to become "n" or rounded up to become "n+1". Accordingly, the absolute error after inverse quantisation can be predicted as "r" if n was rounded down or "q−r" if n was rounded up.

The error calculation module 844 takes the unrounded result C/q from the quantiser and given that "q" is known and fixed for the whole Macro-Block this module is able to estimate the residual error "r" or "q−r" for each DCT coefficient. The residual errors are accumulated for the first (or second) 31 AC coefficients of each DCT block, to give a total error for the whole Macro-Block.

The output of each of the 6 error calculation modules 844 is supplied to the Q_SCALE selection module 860 which selects, for each Macro-Block, a Q_SCALE value denoted Q_FINAL that produces the lowest residual error. The MB delay module 850 is required to compensate for the time taken to perform the residual error calculation. The Q_FINAL values are inserted into the bitstream of the delayed input data to produce the backsearch output signals BKS_OP_D1 and BKS_OP_D2. The output of the backsearch module is supplied as input to the final quantise module 900 where the data is image quantised according to the value Q_FINAL and subsequently Huffman coded in the entropy encoding module 1000.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A data compression apparatus comprising:
   a source detection arrangement for detecting whether or not input data is source data that has not undergone a previous compression/decompression cycle;
   a data quantity generator, responsive to said source detection arrangement, for setting a desired data output quantity for the compressed data, said desired data quantity having a first value for source input data and a second, higher, value for nonsource input data;
   a target allocator for allocating a target data quantity to respective subsets of said input data in dependence upon said desired output data quantity, said target data quantities together providing a desired output data quantity; and
   a data compression arrangement for compressing each subset of said input data in accordance with its respective target data quantity.

2. Apparatus according to claim 1, in which said input data is image data.

3. Apparatus according to claim 2, in which said data compression arrangement comprises:
   one or more trial quantisers for testing at least one degree of quantisation for each subset of said input data, to assess a data quantity which would be generated using that degree of quantisation;
   a selector for selecting a degree of quantisation to be used in compression of said input data, in dependence upon the results of said trial quantiser, so that said target data quantity is not exceeded for that subset; and
   a quantiser for quantising said subsets of said input data in accordance with the respective selected degree of quantisation.

4. Apparatus according to claim 3, comprising:
   a backsearch arrangement comprising at least one quantiser for quantising each of said subsets of input data at the least harsh trial degree of quantisation not exceeding said target data quantity and one or more harsher degrees of quantisation; and
   at least one error calculator for calculating a quantisation error introduced at each degree of quantisation as a result of the quantisation performed by said backsearch quantiser;
   said selector being operable to select a degree of quantisation for use in compressing a subset of said input data as that degree determined by said error calculator to introduce the least error as a result of quantisation by said backsearch quantiser.

5. Apparatus according to claim 4, in which said error calculator accumulates residual errors for a plurality of DCT coefficients to calculate said quantisation error.

6. Apparatus according to claim 4, in which said error calculator comprises: at least one dequantiser for dequantising data quantised by said backsearch quantiser; and
   a comparator for comparing said dequantised data with corresponding unquantised data to detect said quantisation error.

7. Apparatus according to claim 1, in which the first value of said desired data quantity is approximately 5% lower than the second value of said desired data quantity.

8. A data compression method comprising the steps of:
   detecting whether or not input data is source data that has not undergone a previous compression/decompression cycle;
   setting a desired data output quantity for output compressed data, said desired data quantity having a first value for source input data and a second, higher, value for non-source input data;
   allocating a target data quantity to respective subsets of said input data in dependence upon said desired output data quantity, said target data quantities together providing a desired output data quantity; and
   compressing each subset of said input data in accordance with its respective target data quantity.

9. Computer software having program code for carrying out a method according to claim 8.

10. A data providing medium by which computer software according to claim 9 is provided.

11. A medium according to claim 10, said medium being a transmission medium.

12. A medium according to claim 10, said medium being a storage medium.

* * * * *